United States Patent [19]

Matsuda et al.

[11] 4,042,940
[45] Aug. 16, 1977

[54] AUTOMATICALLY CONTROLLED EXPOSURE INDICATING DEVICE FOR A CAMERA

[75] Inventors: Motonobu Matsuda, Izumi; Norio Beppu, Sennan, both of Japan

[73] Assignee: Minolta Camera Kabushiki Kaisha, Osaka, Japan

[21] Appl. No.: 589,859

[22] Filed: June 24, 1975

[30] Foreign Application Priority Data

June 26, 1974 Japan .................................. 49-72227

[51] Int. Cl.² .............................................. G03B 7/06
[52] U.S. Cl. ........................................ 354/39; 354/29; 354/38; 354/60 R
[58] Field of Search ................. 354/26, 29, 38, 39, 354/30, 36, 37, 60 R

[56] References Cited

U.S. PATENT DOCUMENTS

| | | | |
|---|---|---|---|
| 3,554,104 | 1/1971 | Winkler | 354/39 |
| 3,593,629 | 7/1971 | Rentschler | 354/29 |
| 3,605,590 | 9/1971 | Kitai | 354/39 |
| 3,626,825 | 12/1971 | Years | 354/26 |
| 3,645,181 | 2/1972 | Reiche et al. | 354/39 |
| 3,871,005 | 3/1975 | Uchida et al. | 354/38 |
| 3,896,472 | 7/1975 | Yoshiyama et al. | 354/38 |

*Primary Examiner*—L. T. Hix
*Assistant Examiner*—Vit W. Miska
*Attorney, Agent, or Firm*—Watson, Cole, Grindle & Watson

[57] ABSTRACT

A camera is provided with a multi-exposure control system for obtaining proper exposure by either preselecting the diaphragm or the shutter speed and then respectively automatically controlling the shutter speed or the diaphragm aperture in accordance with the intensity of scene light passing through the diaphragm aperture. Structure is provided for obtaining a proper exposure by causing the diaphragm to be either fully opened or at its smallest aperture where with a preselected shutter speed an intermediate diaphragm aperture is not satisfactory. The exposure indicating device obtains an output voltage from an output circuit for computing exposure control voltages in response to step members representing steps of the diaphragm for stopping-down the diaphragm from its fully opened condition to a preselected value so that the output represents the shutter speed to be controlled with the preselected diaphragm aperture.

5 Claims, 3 Drawing Figures

AUTOMATICALLY CONTROLLED EXPOSURE INDICATING DEVICE FOR A CAMERA

BACKGROUND OF THE INVENTION

The present invention relates to an automatically controlled exposure indicating device for a camera having a multi-exposure control system and more particularly, to an exposure indicating device in a multi-exposure control system for a camera. The diaphram is stopped down from its fully open condition to measure the light rays reflected from the photographic objects and which passes through the objective lens and using a shutter speed preselected as a standard, automatically controls the diaphragm aperture to obtain a proper exposure. The apparatus carries out automatic exposure time control in accordance with the intensity of scene light which passes through the controlled diaphragm aperture. The apparatus also carries out automatic exposure control to provide a proper exposure using a diaphragm aperture preadjusted as a standard. Additionally, where the shutter speed is used as a standard when a diaphragm aperture of proper exposure cannot be obtained, automatic exposure time control is carried out by turning the diaphragm either to the fully open or the smallest aperture.

In the prior art, such a diaphragm automatic control camera is well known that uses a preselected shutter speed as a standard and measures the lightness of scene light from objects to be photographed which light passes through the objective lens and the diaphragm to obtain a proper exposure while stopping down the diaphragm aperture from its fully open condition. And a shutter speed automatic control camera is also well known, wherein by setting the diaphragm aperture beforehand the shutter speed is automatically controlled in accordance with the lightness of objects which pass through the objective lens and the diaphragm, and the shutter speed can be controlled so as to obtain a proper exposure. In such control system cameras either the shutter speed or the diaphragm aperture is controlled. Therefore, an indication of the controlled shutter speed or controlled diaphragm aperture can be done easily by making use of a meter or the like.

In such cameras, however, it is impossible to optionally select the shutter speed control or the diaphragm aperture control in compliance with the intention of an operator. In addition, in an automatic exposure control camera of such a type that automatically controls the diaphragm aperture by a preselected shutter speed, depending upon the lightness of objects to be photographed there sometimes occurs a case where even though the diaphragm aperture is adjusted to the smallest aperture for the preselected shutter speed, an overexposure may result. Also, there occurs another case where even though the diaphragm aperture is kept in its fully open condition, an underexposure may result, and thus controlling the diaphragm aperture for obtaining a proper exposure may become impossible.

Whereas, the assignee of the present application has proposed a camera of a multi-exposure control system in which the exposure control of both such systems is enabled, and the drawbacks mentioned above are removed. (U.S. Ser. No. 486,427, filed July 8, 1974.)

In such a multi-exposure control system camera, when it is intended to indicate an automatically controlled exposure, the exposure indicating device thereof becomes very complicated and expensive to manufacture, and accordingly difficult to adopt in a camera.

OBJECTS OF THE INVENTION

One object of the present invention is to provide an exposure indicating device which indicates the exposure by a simple structure in a multi-exposure system for a camera. p Another object of the present invention is to provide an exposure indicating device which indicates the controlled exposure by means of one meter and one dial plate no matter what exposure control is tried in a multi-exposure control system for a camera.

Still another object of the present invention is to provide an exposure indicating device wherein for automatic diaphragm aperture control with the shutter speed preselected and in accordance with the lightness of objects to be photographed, when it is impossible to obtain a proper diaphragm aperture for the preselected shutter speed, the indicating device indicates that the diaphragm is controlled to the fully open or the smallest aperture and also indicates the shutter speed to be carried out with that aperture setting.

The above objects, advantages, and features of the present invention will be apparent from the description of the embodiments shown in the drawings.

SUMMARY OF THE INVENTION

The present invention relates to an exposure indicating device for a camera, wherein the object scene light, which passes through the objective lens and the diaphragm, is measured, the diaphragm is stopped-down from its fully open condition prior to the exposure initiation in conjunction with the release operation, and then the diaphragm aperture is controlled to either a preselected value, an automatically determined value or a fully open or smallest aperture value. When the diaphragm aperture is preselected, the diaphragm aperture is set to the preselected value. When the shutter speed is preselected the control for the diaphragm aperture to obtain a proper exposure is accomplished in accordance with that shutter speed. When it is impossible to control as indicated in either of the above two ways, a diaphragm setting is determined by controlling the diaphragm aperture to obtain an approximate proper exposure, and an exposure controlling circuit produces signals for controlling the shutter speed on the basis of the stop-down measurement of the object scene light passing through the diaphragm aperture as determined above. A circuit is provided for adjusting the output voltage of the exposure control circuit in accordance with step numbers to which the diaphragm can be stopped-down from its fully open condition, and thereby signals for indicating the shutter speed controlled by the output voltage of the aforesaid circuit are produced.

The multi-exposure control system in accordance with the present invention is endowed with functions which carry out the following exposure controls:
1. By preselecting the shutter speed the automatic control of the diaphragm aperture is carried out.
2. By presetting the diaphragm aperture the shutter speed is automatically controlled.
3. In (1) above:
   a. When a diaphragm aperture is obtained for a proper exposure in accordance with the shutter speed selected in accordance with the object lightness, the normal automatic diaphragm control is carried out.

b. Whereas, when the object lightness is too light and outside the range in (a) above, the diaphragm is stopped-down to the smallest diaphragm aperture and gives priority to the smallest diaphragm aperture, thereby the shutter speed corresponding to this fact is automatically controlled at a higher speed than the selected shutter speed.

c. When the object lightness is too dark and outside the range in (a) above, the fully open diaphragm aperture is given priority, thereby the shutter speed corresponding to this fact is automatically controlled at a lower speed than the selected shutter speed.

In the respective exposure controls described above, the exposure indicating device is required to indicate respectively the shutter speed controlled in the case of (2), the diaphragm aperture controlled in the case of (3) (a), and the fact that the diaphragm is in the smallest aperture or in the fully open condition, and the shutter speed controlled in the cases of (3) (b) and (3) (c).

The exposure controlling circuit, therefore, in the case of (2) wherein the diaphragm is given priority so as to control the shutter speed, can be arranged to control the shutter speed in conjunction with the release operation. However, in the cases of (3) (a) (b) and (c), prior to the exposure initiation in conjunction with the release operation, the diaphragm is controlled and after the diaphragm is controlled the shutter speed is automatically controlled on the basis of the stopped-down light measurement.

And, initially the diaphragm is always in the fully open condition and in the case of (2) the adjusting ring is adjusted for the preselected diaphragm aperture, and in the cases of (3) (a) (b) and (c) it is adjusted beforehead for the smallest diaphragm aperture.

Therefore, in order to indicate an exposure to be controlled it is necessary to produce signals for indicating the exposure automatically controlled by adjusting both sources of data; signals of one controlling the shutter speed on the basis of the stopped-down measurement and the signals of the other being proportional to step numbers to which the diaphragm can be stopped-down by the diaphragm adjusting ring.

By inputting the two signals into, for example, a meter, when the camera is used as described in the above mentioned paragraph (2) the shutter speed for giving a proper exposure directly is indicated. When the camera is used as described in the above mentioned paragraph (3) the possible interlocking range of the shutter speed and the diaphragm is indicated.

DETAILED DESCRIPTION OF THE INVENTION

Figure 1:
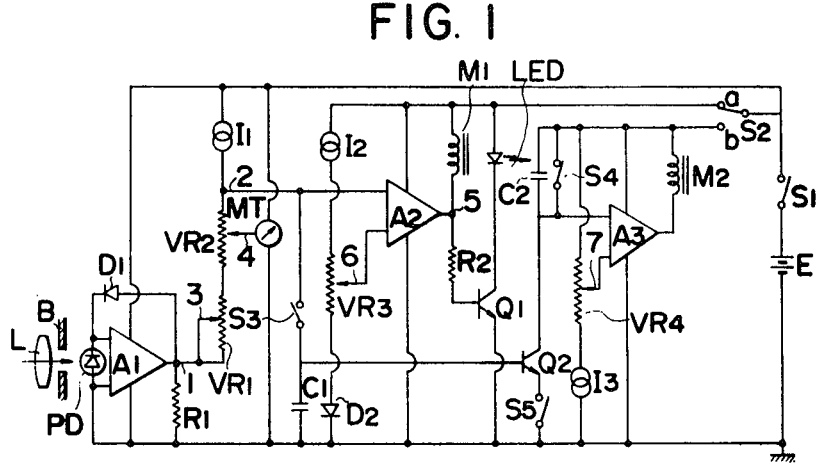
FIG. 1 is a circuit diagram showing one embodiment of the exposure controlling circuit in accordance with the present invention.

FIG. 1 shows the automatic exposure controlling circuit wherein the voltage across the terminals of photodiode PD receiving the scene light of photographic objects which passes through objective lens L and diaphragm B is input into differential amplifier circuit $A_1$. Output terminal 1 thereof and one end of photodiode PD are connected through logarithmic compression diode $D_1$ and the negative feedback is provided therebetween. Resistor $R_1$ is an output resistor and a light measuring circuit is formed by the aforesaid elements, and through the function of the differential amplifier $A_1$ the voltage across photodiode PD is retained at approximately zero volts. Accordingly, photodiode PD produces a photo-current in good proportional precision relative to the incident light, not including the dark current, and this current flows through diode $D_1$. As a result, across diode $D_1$ a voltage proportional to the logarithm value of the incident light is generated.

Constant current source $I_1$ and a series connected circuit of the resistance of potentiometers $VR_1$ and $VR_2$ form a level shift circuit, and at terminal 2 a shutter speed control signal voltage, which is the output voltage of terminal 1 plus the voltage between terminals 2 and 3, is generated.

Potentiometers $VR_1$ and $VR_2$ each have a linear characteristic and sliding member 3 of resistor $VR_1$ moves in response to the film sensitivity setting. And sliding member 4 of potentiometer $VR_2$ interlocks with the diaphragm preset ring and is moved in response to step numbers to which the preset ring is stopped-down to the diaphragm aperture preset from the fully open diaphragm aperture. And when the preset diaphragm aperture coincides with the fully open diaphragm aperture, sliding member 4 coincides with terminal 2.

Meter MT, when the camera is used for automatic shutter speed control by preselecting the diaphragm aperture, indicates the shutter speed representation of a proper exposure for the preselected diaphragm aperture setting. When the camera is used for diaphragm automatic control by preselecting the shutter speed, meter MT indicates the diaphragm range possible to operate with the shutter speed priority, making use of the voltage generated on sliding member 4 as a input.

$A_2$ is a switching circuit consisting of a differential amplifier circuit, and to terminal 5 thereof electromagnet $M_1$ for restraining the stopping-down operation of the diaphragm is connected. The circuit consisting of constant current source $I_2$, and the resistance of potentiometer $VR_3$ and diode $D_2$, which are connected in series with constant current source $I_2$, is a circuit to provide a switching level to switching circuit $A_2$. Sliding member 6 of potentiometer $VR_3$, when the automatic diaphragm control is carried out by preselecting the shutter speed, is interlocked with the setting of the shutter speed. Therefore, potentiometer $VR_3$ having a linear characteristic, is used and diode $D_2$ compensates for variation of the characteristic of diode D, due to temperature change.

The circuit consisting of resistor $R_2$, transistor $Q_1$, and luminous emitting diode LED is a circuit for indicating when the diaphragm automatic control is carried out by preselecting the shutter speed when it is impossible to provide a proper diaphragm aperture for the preselected shutter speed.

Switch $S_3$ is ordinarily closed and is opened just before the movable mirror springs up after the diaphragm of a single lens reflex camera is stopped-down to a determined diaphragm aperture in conjunction with the release operation so that the output voltage of terminal 2 is stored in storage capacitor $C_1$.

Transistor $Q_2$, the base of which is connected to one terminal of storage capacitor $C_1$, is an expansion transistor which generates current proportional to the antilogarithm of voltage of storage capacitor $C_1$ connected between the base and the emitter of transistor $Q_2$. Capacitor $C_2$, connected to the collector of transistor $Q_2$, is an integrating capacitor for integrating the collector current thereof. Switch $S_4$, connected in parallel with integrating capacitor $C_2$, is a discharge switch for capacitor $C_2$ and is ordinarily closed, and is opened prior to the opening of the shutter in conjunction with the release operation. And switch $S_5$, connected to the emitter of transistor $Q_2$, is a trigger switch ordinarily opened and is closed simultaneously with the opening of the shutter. When switch $S_5$ is closed, the charging of integrating capacitor $C_2$ due to the collector current of expansion transistor $Q_2$ is started.

$A_3$ is a switching circuit consisting of a differential amplifier circuit which actuates electromagnet $M_2$ when integrating capacitor $C_2$ is charged to the predetermined level and releases the restraint of the shutter closing. Potentiometer $VR_4$ is connected in series to constant current source $I_3$ and sliding member 7 provides a switching level to switching circuit $A_3$.

Switch $S_1$ is an electric power source switch and switch $S_2$ is a change-over switch for changing-over the operation of the exposure control means as is known to those skilled in the art. Switch $S_2$ is always connected to contact *b* in the case where the shutter speed is automatically controlled by presetting the diaphragm by means of the adjusting ring, and when the diaphragm is automatically controlled by preselecting the shutter speed, switch $S_2$ is connected at first to contact *a* and changed-over from contact *a* to contact *b* prior to the opening of the shutter after the diaphragm determining operation is terminated in conjunction with the release operation.

Just before the movable mirror springs up the scene light of objects to be photographed passing through objective lens L and diaphragm B is received by photodiode PD, so that a measured light output voltage corresponding to the lightness of objects to be photographed and the diaphragm aperture setting is generated at terminal 1 of resistor $R_1$.

To that measured light output voltage, a voltage corresponding to the film sensitivity is added by sliding member 3 of potentiometer $VR_1$, and further a constant voltage from potentiometer $VR_2$ is added. Thereby, shutter speed control signal voltage VT is generated on terminal 2 and stored by storage capacitor $C_1$. When signal voltage VT is provided to the base-emitter of expansion transistor $Q_2$ the shutter speed is controlled thereby.

Through the shutter release operation, the camera is to be constructed so as to operate as follows. The diaphragm is operated to stop-down from the fully open condition to the diaphragm aperture preset by the diaphragm adjusting ring. Therefore, in the case where diaphragm automatic control is desired by preselecting the shutter speed, the diaphragm adjusting ring is preset for the smallest diaphragm aperture. When the stop-down operation of the diaphragm is terminated, storing switch $S_3$ is opened and shutter speed control signal voltage VT, determined by the stopped-down measurement, is stored by storage capacitor $C_1$. Subsequently, discharge switch $S_4$ is opened and the shutter is released. Simultaneously with the opening of the shutter, trigger switch $S_5$ is closed and integrating capacitor $C_2$ starts to be charged by the collector current of expansion transistor $Q_2$. When capacitor $C_2$ reaches a predetermined voltage, the exposure time to be controlled elapses and the shutter is closed to terminate the exposure. Switches $S_3$ and $S_4$ are closed again and trigger switch $S_5$ is opened. Since the camera carries out the above operations in succession, at the step where the release operation is not carried out the shutter speed control voltage for providing a proper exposure with the fully open diaphragm is output to terminal 2. Therefore, on terminal 4 the shutter speed signal voltage for providing a proper exposure to the preset diaphragm is generated. Accordingly, in the case where the automatic shutter speed control is carried out by presetting the diaphragm as described in the above mentioned paragraph (2), it is possible to indicate the shutter speed for a proper exposure to the diaphragm value to be set. And, in the case where the automatic diaphragm control is carried out by preselecting the shutter speed as described in the above mentioned paragraph (1), the diaphragm adjusting ring is set for the smallest diaphragm aperture and the desired shutter speed is selected by means of a shutter speed dial. And thereby in response to the selection of shutter speed, sliding member 6 is moved on potentiometer $VR_3$. To one input of switching circuit $A_2$, consisting of the differential amplifier circuit, a switching level corresponding to the selected shutter speed is provided. And when the selected value of the shutter speed is changed by one step, for example, from 1/60 second to 1/125 second the level of sliding member 6 is changed by a constant voltage. In this case, even before the release operation is carried out, change-over switch $S_2$ is in connection with the contact *a* as described hereinbefore.

As described in the above mentioned paragraphs (3) (*a*) and (3) (*b*), in the diaphragm fully open condition, when the potential at terminal 2 is higher than that of sliding member 6 electromagnet M1 is excited. Upon pushing the release button the stop-down operation from the diaphragm fully open condition is started. Accordingly, the potential at terminal 2 drops, and when it coincides with the potential at sliding member 6, the excitation of electromagnet M1 is shut off by switching circuit $A_2$. When the excitation of electromagnet M1 is shut off the diaphragm restraining member attracted by electromagnet M1 is released to restrain the stop-down operation, and thereby the diaphragm aperture is determined.

As described in the above mentioned paragraph (3) (*b*), even though the diaphragm is stopped-down to the smallest diaphragm aperture, when the potential at terminal 2 is higher than that of the sliding member 6, electromagnet M1 is de-energized because change-over switch $S_2$ is changed over from contact *a* to contact *b* as described hereinbefore. And thus, the shutter speed is controlled by the object scene light which passes through the determined diaphragm aperture.

Figure 2:
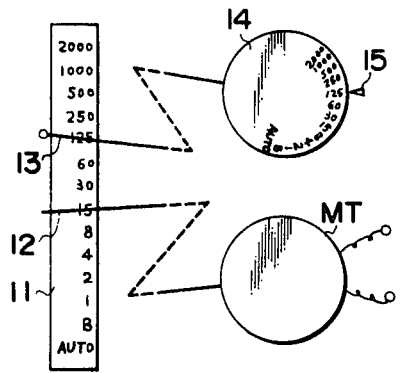
FIG. 2 is a top view showing the essential portions of the exposure indicating device in the same embodiment.

FIG. 2 is a top view showing one embodiment of the indicating mechanism shown in the finder of the camera. Reference numeral 11 denotes a shutter speed dial plate on which shutter speeds are graduated and 12 denotes a meter pointer of meter MT. On shutter speed dial 14 the scale of the shutter speeds selected is formed, which is so constructed as to coincide with index 15 of the camera, and pointer 13 protrudes from speed dial 14 and is so arranged as to move on dial plate 11. Meter MT is connected to the indicating circuit as shown in FIG. 1. Meter pointer 12 indicates the shutter speed for a proper exposure with the diaphragm aperture preset by the diaphragm ring at the time when the diaphragm is in its fully open condition.

Therefore, in the case where the camera is so arranged that the shutter speed may be automatically controlled by adjusting the diaphragm according to priority, the indicating value of meter pointer 12 indicates the controlled shutter speed. However, in practice the control of the shutter speed is constructed to be controlled by the stopped-down measurement, so that the indicating value should be expressed to indicate a presumed shutter speed. However, in the case of the operation described in paragraph (2) above, there is little difference between both shutter speeds and, for practical use, the indicating value indicates the shutter speed controlled. Further, in the case where the shutter speed is automatically controlled by presetting the diaphragm, by so setting the "AUTO" scale of shutter speed dial 14 on index 15, switch $S_2$ is always on the contact b side and the mechanism for restraining the stopping-down operation of the diaphragm is so structured as to become inoperative. In this case, for example, sliding member 6 can be so arranged that its potential may be always lower than that produced at terminal 2. And in this case, instead of changing-over switch $S_2$ it is also possible to operate a lock mechanism for turning the stopping-down operation restraining mechanism mechanically to the inoperative state.

Next, in the case where automatic diaphragm control is carried out by preselecting the shutter speed, a desired shutter speed scale on shutter speed dial 14 is aligned with index 15. Thereby, on shutter speed dial plate 11 the desired shutter speed is indicated by pointer 13. In this case, as described hereinbefore the diaphragm adjusting ring to be set for the smallest diaphragm aperture (for example, F 16). Accordingly, meter pointer 12 indicates the shutter speed for providing a proper exposure to the smallest diaphragm aperture (F 16). Now, supposing that as shown in FIG. 2 the meter pointer indicates 1/15 second and shutter speed T is 1/125 second, there is a difference of three steps between both shutter speeds and the correct diaphragm value controlled becomes F5.6 which is less by three steps than F 16. Similarly, when shutter speed T is selected to 1/60 second the correct diaphragm aperture becomes F 8, and when selected to 1/15 second the correct diaphragm aperture becomes F 16. If shutter speed T is selected to ⅛ second which is a lower speed than that shown at the swinging position of meter pointer 12 as 1/15 second, the diaphragm aperture for providing a proper exposure becomes F 22. However, since the smallest diaphragm aperture is F 16, as described in the above mentioned paragraph (3) (b), a shutter speed T of ⅛ second cannot be obtained. Accordingly, the exposure control is carried out with diaphragm aperture F 16 and shutter speed T at 1/15 second. That is, in the case where a lower shutter speed than that shown at the swinging position of meter pointer 12 (the lower side) is selected, the camera becomes impossible to function for the shutter speed priority.

In this manner, in the case where the exposure control is carried out for the shutter speed priority, it is indicated that setting shutter speed T should be set for the shutter speed indicated by meter pointer 12 or a higher speed than that.

And, in the case where instead of setting the diaphragm beforehand for the smallest diaphragm aperture F 16 by means of the diaphragm adjusting ring, by setting it, for example, for F 8 which is less by two steps, the automatic diaphragm control is carried out by preselecting the shutter speed. Provided that objects to be photographed are the same lightness as in the above case, meter pointer 12 indicates 1/60 second which is a higher speed by two steps and the diaphragm at that time becomes the smallest preset diaphragm aperture F 8.

As described above, the diaphragm aperture is not directly indicated but the range to operate for the shutter speed priority is indicated and the indirectly controlled diaphragm aperture is indicated.

Further, in the case where the shutter speed is preselected, the following operations are performed as well. That is, for example, when the diaphragm preset ring is set for the smallest diaphragm aperture F 16, supposing meter pointer 12 indicates ¼ second and also the setting shutter speed T is 1/1000 second, which is a higher speed by eight steps than ¼ second, thereby the diaphragm aperture for a proper exposure according to the foregoing conditions becomes F 1 which is lower by eight steps. In this manner, in the case outside of the interlocking range as in the above mentioned paragraph (3) (c), in the circuit shown in FIG. 1, the potential at sliding member 6 becomes higher than that of terminal 2 under the condition preceding the release operation. Therefore, electromagnet $M_1$ is always de-energized, and transistor $Q_1$ is conductive. Thereby, luminous emitting diode LED is energized to indicate that a shutter speed out of the range of automatic diaphragm control is selected. This fact shows that the shutter speed is controlled at a lower speed than the shutter speed selected.

Therefore, even though the shutter speed T selected is set for the low speed limit 1/30 which produces no effect of camera movement, when luminous emitting diode LED is still energized it is indicated that the shutter speed control moves to a lower speed. Accordingly, by making use of a tripod or a flash it is possible to prevent camera movement from affecting the photograph.

Figure 3:
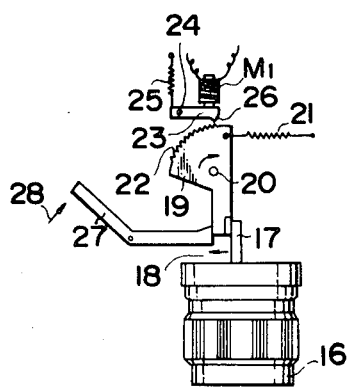
FIG. 3 is a top view showing the essential portions of the control mechanism for stopping-down the diaphragm.

FIG. 3 shows an embodiment of the structure for carrying out the stopping-down operation of the diaphragm. Exchangeable objective lens 16 is provided with rotatable diaphragm operation lever 17 about the optical axis as a center. Lever 17 is biased in the direction shown by arrow 18 by a spring not shown in the drawings. When lever 17 moves in the reverse direction, diaphragm blade B is opened and when it moves in the direction shown by arrow 18, the diaphragm is stopped-down. On the camera body, control member 19, engageable with diaphragm operation lever 17, is rotatably supported by pin 20 and biased clockwise by spring 21, and on its periphery toothed portion 22 is formed about pin 20 as a center.

Restraining lever 23, attracted by electromagnet $M_1$ and mounted to the camera body, is rotatably supported by pin 24 and given a clockwise turning tendency by spring 25. And when lever 23 is released from the attraction of electromagnet $M_1$, pawl 26, engageable with toothed portion 22, restrains the movement of diaphragm control member 19 due to spring 21 when pawl 26 is engaged with toothed portion 22.

In the position where diaphragm control member 19 restrains diaphragm operation lever 17 in the diaphragm fully open condition, lever 27 engages with diaphragm control member 19 to restrain its turning and turns clockwise in conjunction with the release operation to release the aforesaid restraint.

And, when the shutter cocking has been carried out, the state shown in FIG. 3 is achieved by a mechanism not shown in the drawings. When the release operation is carried out by pushing the shutter button, lever 27 is rotated in the direction of arrow 28 to release the restraint of diaphragm control member 19 shown in FIG. 3. With the clockwise rotation of diaphragm rotation of diaphragm control member 19, diaphragm operation lever 17 is moved in the direction of arrow 18 to stop-down the diaphragm. When electromagnet $M_1$ is demagnetized, pawl 26 of restraining lever 23 engages with toothed portion 22 to restrain the rotation of diaphragm control member 19, thereby the stopping-down opertion due to diaphragm operation lever 17 is restrained.

While the described embodiment represents the preferred form of the present invention, it is to be understood that modifications will occur to those skilled in the art without departing from the spirit of the invention.

What is claimed is:

1. An automatically controlled exposure indicating means in a camera having an objective lens and an adjustable diaphragm, comprising:
    means for stopping-down the diaphragm from its fully open condition to the smallest diaphragm aperture prior to the exposure initiation in conjunction with the release operation;
    first diaphragm aperture determining means for restraining said means stopping-down the diaphragm at a preadjusted diaphragm aperture;
    a light measuring circuit for measuring the object scene light passing through the objective lens and the diaphragm;
    a first circuit for generating an output corresponding to preselected shutter speed;
    second diaphragm aperture determining means for restraining said means for stopping-down the diaphragm by comparing the output of said light measuring circuit with said output of said first conduit;
    means for controlling the shutter speed in accordance with the output of said light measuring circuit with the diaphragm aperture determined by either said first or second diaphram determining means;
    a second circuit for generating an output obtained by subtraction of a voltage proportional to the step numbers of diaphragm apertures to which the diaphragm can be stopped-down from the fully open condition by means of said first diaphragm aperture determining means from the output of said light measuring circuit; and
    a meter circuit for indicating the shutter speed, in accordance with the output of said second circuit.

2. An exposure indicating means as in claim 1, further comprising:
    a dial plate for indicating the shutter speed by means of a meter pointer connected to said meter circuit;
    means for preselecting a shutter speed; and
    a member for indicating on said dial plate the shutter speed for selecting said shutter speed means.

3. An exposure indicating means as in claim 1, further comprising a resistor connected in series with said light measuring circuit for generating an output voltage proportional to the logarithmic value of the object lightness which passes through the objective lens and the diaphragm, said exposure indicating means further comprising a first potentiometer including a sliding member movable in response to the film sensitivity setting, and a second potentiometer for generating a voltage corresponding to the fully open diaphragm or the smallest diaphragm aperture, and means for feeding constant current to said first and second potentiometers; and wherein the output of a sliding member for said second potentiometer in interlocking relationship with said first diaphragm determining means is an input to said meter circuit.

4. An exposure indicating means as in claim 1, further comprising means for supplying said first circuit with a constant current and a potentiometer having a resistance changed in accordance with the shutter speed selected; said second diaphragm aperture determining means including a first input terminal to which the output of the sliding member of said potentiometer is connected and a second input terminal to which the output of said light measuring circuit is connected; and a differential amplifier and an electromagnet connected to the output terminal thereof, said differential amplifier comparing the voltages of said first and second input terminals.

5. An exposure indicating means as in claim 4, further comprising:
    a transistor including a base connected to the output terminal of said differential amplifier circuit through a resistor; and
    an indicating means connected to a circuit switched by said transistor and activated when the output voltage of said first input terminal is higher than the voltage of said second input terminal.

* * * * *